(12) United States Patent
Kitao

(10) Patent No.: US 10,673,075 B2
(45) Date of Patent: Jun. 2, 2020

(54) FUEL CELL CATALYST LAYER FOR IMPROVING POWER GENERATION

(71) Applicant: TOYOTA JIDOSHA KABUSHIKI KAISHA, Toyota-shi, Aichi-ken (JP)

(72) Inventor: Noriyuki Kitao, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 351 days.

(21) Appl. No.: 15/592,631

(22) Filed: May 11, 2017

(65) Prior Publication Data

US 2017/0331119 A1    Nov. 16, 2017

(30) Foreign Application Priority Data

May 13, 2016   (JP) .................................. 2016-097280

(51) Int. Cl.
*H01M 4/86*       (2006.01)
*B01J 39/20*      (2006.01)
(Continued)

(52) U.S. Cl.
CPC .......... *H01M 4/8673* (2013.01); *B01J 39/20* (2013.01); *H01M 4/86* (2013.01); *H01M 4/8663* (2013.01);
(Continued)

(58) Field of Classification Search
CPC ........ H01M 4/96; H01M 4/86; H01M 4/8605; H01M 8/0245; H01M 8/0239; H01M 8/0241; H01M 8/0234
See application file for complete search history.

(56) References Cited

U.S. PATENT DOCUMENTS

2003/0078308 A1 * 4/2003 Holdcroft .............. C08J 5/2237
                                                            521/27
2006/0258759 A1 * 11/2006 Shafer .................... C08J 5/2218
                                                            521/27
(Continued)

FOREIGN PATENT DOCUMENTS

EP           1927601     *  6/2008
JP        2001302721     * 10/2001
(Continued)

OTHER PUBLICATIONS

Journal of Polymer Science, Part B: Polymer Physics 2014,52,624-632 1. (Year: 2014).*
(Continued)

*Primary Examiner* — Alexander Usyatinsky
(74) *Attorney, Agent, or Firm* — Hunton Andrews Kurth LLP

(57) ABSTRACT

A fuel cell includes: an electrolyte membrane; an anode catalyst layer; a cathode catalyst layer; and a cathode gas diffusion layer. The cathode catalyst layer includes an ionomer, the ionomer includes copolymers each of which has a hydrophilic block. The hydrophilic block is positioned at a terminal of a copolymer which includes a hydrophobic portion and a hydrophilic portion having a sulfonic acid group. The hydrophilic block has an aggregated structure of the hydrophilic portion. A gas diffusion resistance coefficient of the cathode gas diffusion layer is $3.2 \times 10^{-4}$ m or lower. The gas diffusion resistance coefficient is expressed by "Gas Diffusion Resistance Coefficient=Thickness of Cathode Gas Diffusion Layer/(Porosity of Cathode Gas Diffusion Layer)$^4$".

12 Claims, 10 Drawing Sheets

(51) Int. Cl.
*H01M 8/1004* (2016.01)
*H01M 8/1067* (2016.01)
*H01M 8/1018* (2016.01)

(52) U.S. Cl.
CPC ....... *H01M 8/1004* (2013.01); *H01M 8/1067* (2013.01); *H01M 2004/8689* (2013.01); *H01M 2008/1095* (2013.01); *H01M 2250/20* (2013.01); *Y02E 60/521* (2013.01)

(56) References Cited

U.S. PATENT DOCUMENTS

| | | | | |
|---|---|---|---|---|
| 2008/0063921 | A1* | 3/2008 | Hong | H01B 1/122 429/482 |
| 2012/0094215 | A1 | 4/2012 | Satou et al. | |
| 2012/0270138 | A1* | 10/2012 | Koshino | C08G 61/10 429/482 |
| 2017/0237079 | A1* | 8/2017 | Tanimura | H01M 4/96 429/534 |

FOREIGN PATENT DOCUMENTS

| | | | |
|---|---|---|---|
| JP | 2001302721 | A | 10/2001 |
| JP | 2002212246 | A | 7/2002 |
| JP | 2003036856 | * | 2/2003 |
| JP | 2004-158388 | A | 6/2004 |
| JP | 2008311180 | A | 12/2008 |
| JP | 2009-080968 | A | 4/2009 |
| JP | 4501963 | * | 7/2010 |
| JP | 2011-029171 | A | 2/2011 |
| JP | 2016015216 | A | 1/2016 |
| WO | 2016060043 | A1 | 4/2016 |
| WO | WO 2016/06003 | * | 4/2016 |

OTHER PUBLICATIONS

Nafion, Suppl. material.*
Decision to grant a Patent, issued JPO for Application No. 2016-097280 (Year: 2019).*
"In situ Diagnostics of Water in Polymer Electrolyte Fuel Cells for Wanter Transport Analysis" Bunseki Kagaku vol. 59, No. 1, 11 pp. 1-11 (2010). (URLhttps://www.jstage.jst.go.jp/article/bunsekikagaku/59/1/59_1_1/_pdf).

* cited by examiner

RELATED ART
FIG. 3A  RANDOM TYPE IONOMER
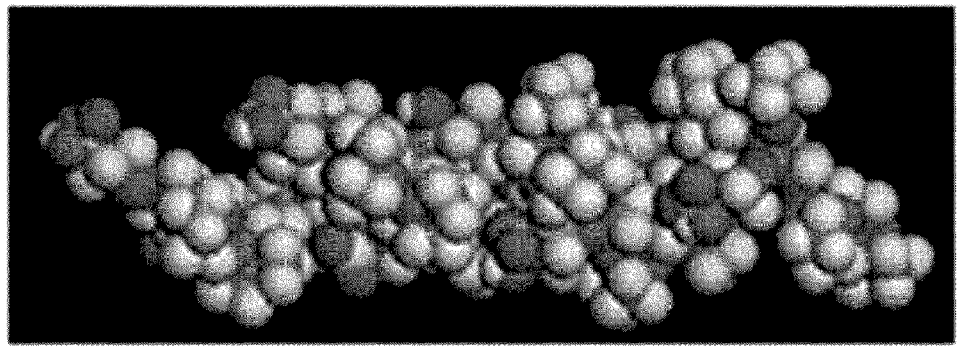
FIG. 3B  BOTH-TERMINAL-BLOCK TYPE IONOMER
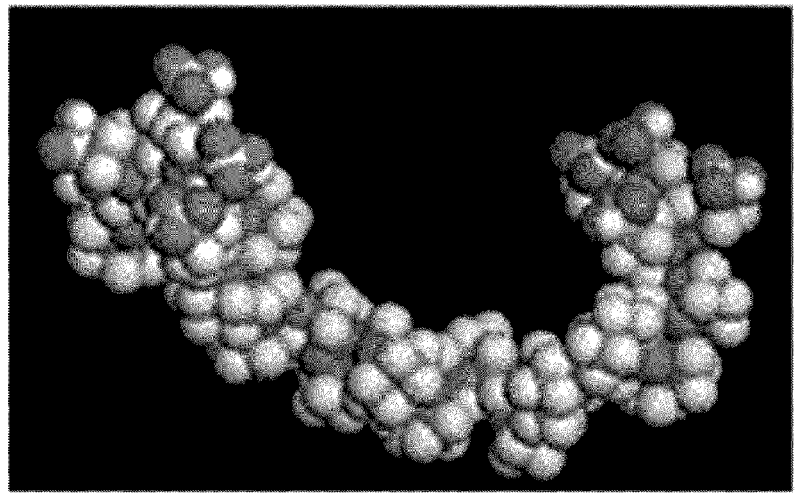
FIG. 3C  SINGLE-TERMINAL-BLOCK TYPE IONOMER
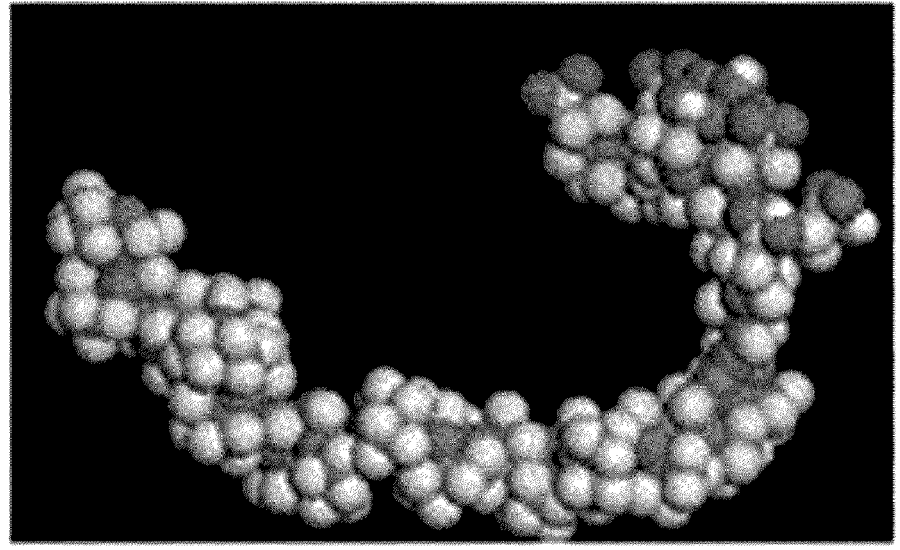

FUEL CELL CATALYST LAYER FOR IMPROVING POWER GENERATION

INCORPORATION BY REFERENCE

The disclosure of Japanese Patent Application No. 2016-097280 filed on May 13, 2016 including the specification, drawings and abstract is incorporated herein by reference in its entirety.

BACKGROUND

1. Technical Field

The present disclosure relates to a fuel cell.

2. Description of Related Art

A solid polymer fuel cell includes: a membrane electrode assembly in which a catalyst layer is provided on both surfaces of an electrolyte membrane; and a gas diffusion layer that is provided outside the membrane electrode assembly. For example, a fuel cell is known in which a catalyst layer includes a pore forming material for improving water exhaust performance in order to improve power generation performance and in which a water retention layer for improving water retention is provided between the catalyst layer and a gas diffusion layer (for example, Japanese Patent Application Publication No. 2004-158388 (JP 2004-158388 A)).

SUMMARY

In order to improve power generation performance during a low load operation, it is necessary that the drying of a catalyst layer is suppressed to suppress a decrease in the utilization rate of a catalyst. On the other hand, the improvement of power generation performance during a high load operation can be realized, for example, by reducing the gas diffusion resistance of a gas diffusion layer to suppress the occurrence of concentration overvoltage. However, in a case where the gas diffusion resistance is reduced, for example, by increasing the pore size in a gas diffusion layer to improve power generation performance during a high load operation, water retention also deteriorates, which may promote the drying of a catalyst layer. Therefore, it is difficult to simultaneously realize the improvement of power generation performance during a low load operation and the improvement of power generation performance during a high load operation.

The disclosure simultaneously realizes the improvement of power generation performance during a low load operation and the improvement of power generation performance during a high load operation.

According to an aspect of the disclosure, there is provided a fuel cell including: an electrolyte membrane; an anode catalyst layer that is provided on a first surface of the electrolyte membrane; a cathode catalyst layer that is provided on a second surface of the electrolyte membrane; and a cathode gas diffusion layer that is provided outside the cathode catalyst layer. The cathode catalyst layer includes an ionomer including copolymers each of which has a hydrophilic block. The hydrophilic block is positioned at a terminal of a copolymer. The copolymer includes a hydrophobic portion and a hydrophilic portion having a sulfonic acid group. The hydrophilic block has an aggregated structure of the hydrophilic portion. A gas diffusion resistance coefficient of the cathode gas diffusion layer is $3.2 \times 10^{-4}$ m or lower. The gas diffusion resistance coefficient is expressed by "Gas Diffusion Resistance Coefficient=Thickness of Cathode Gas Diffusion Layer/(Porosity of Cathode Gas Diffusion Layer)$^4$".

The copolymer may be a random copolymer having the hydrophilic portion at the terminal portion. The copolymer may be a block copolymer or a graft copolymer.

The number of repeats of the hydrophilic portion in the hydrophilic block may be 11 to 16.

A lower melting point water content in the ionomer may be 28 dry % to 38 dry %.

An oxygen permeability of the ionomer at a relative humidity of 30% or higher may be $20 \times 10^{-12}$ mol/(cm$^2$×s×atm) or higher.

The hydrophilic portion may have a structure represented by the following Formula A1, and the hydrophobic portion may have a structure represented by the following Formula B1,

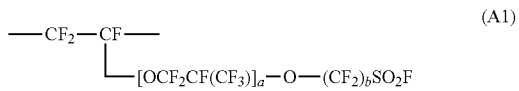

$$—CF_2—CF— \quad (A1)$$
$$|$$
$$[OCF_2CF(CF_3)]_a—O—(CF_2)_bSO_2F$$

where a represents an integer of 0 or more, and b represents an integer of 2 or more,

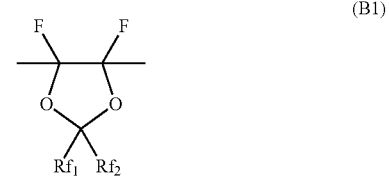

(B1)

where Rf$_1$ and Rf$_2$ each independently represent fluorine or a perfluoroalkyl group having 1 to 10 carbon atoms. The perfluoroalkyl group which may have an ether bond in the middle.

A portion of the copolymer other than the hydrophilic block may include a non-aggregated portion According to the disclosure, the improvement of power generation performance during a low load operation and the improvement of power generation performance during a high load operation can be simultaneously realized.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A is a diagram showing a molecular structure of a random type ionomer;

FIG. 3B is a diagram showing a molecular structure of a both-terminal-block type ionomer;

FIG. 3C is a diagram showing a molecular structure of a single-terminal-block type ionomer;

DETAILED DESCRIPTION OF EMBODIMENTS

Hereinafter, an embodiment of the disclosure will be described with reference to the drawings.

Figure 1:
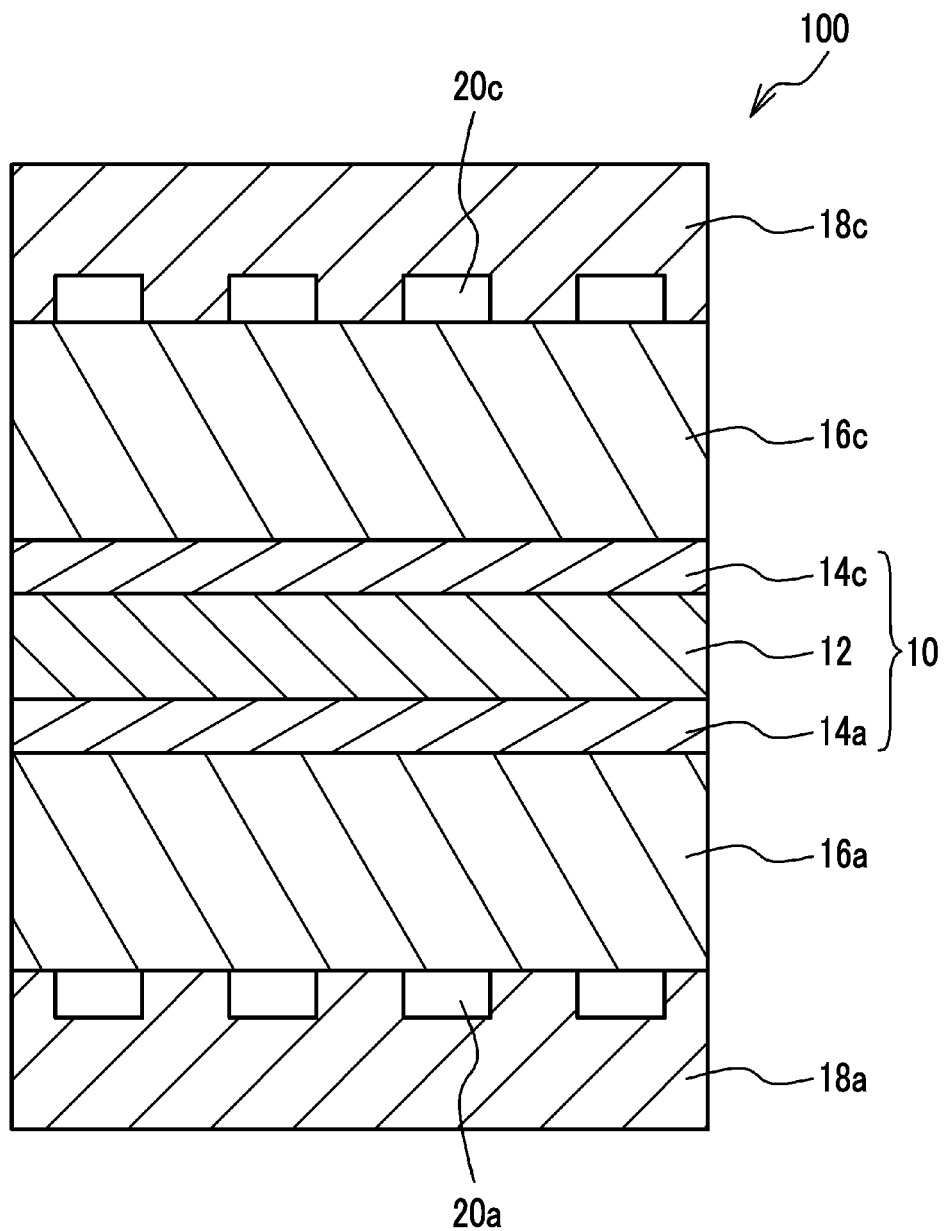
FIG. 1 is a sectional view showing a configuration of a fuel cell.

A fuel cell according to the embodiment is a solid polymer fuel cell that generates power by the supply of a fuel gas and an oxidant gas as reaction gases, and has a stack structure in which a plurality of single cells are stacked. The fuel cell according to the embodiment is mounted on, for example, a fuel cell vehicle or an electric vehicle. FIG. 1 is a sectional view showing a configuration of a fuel cell 100.

As shown in FIG. 1, the fuel cell 100 includes a membrane electrode assembly (MEA) 10, and the membrane electrode assembly 10 includes: an electrolyte membrane 12; an anode catalyst layer 14*a* that is provided on a first surface of the electrolyte membrane 12; and a cathode catalyst layer 14*c* that is provided on a second surface of the electrolyte membrane 12. The electrolyte membrane 12 is a solid polymer membrane which is formed of a fluororesin material having a sulfonic acid group or a hydrocarbon resin material and has excellent proton conductivity in a wet state. Each of the anode catalyst layer 14*a* and the cathode catalyst layer 14*c* includes: a carbon support on which a catalyst for causing an electrochemical reaction to progress is supported; and an ionomer that is a solid polymer having a sulfonic acid group and has excellent proton conductivity in a wet state. The ionomer of the embodiment consists of a plurality of copolymers, but the ionomer will be explained as one copolymer for ease of explanation.

On opposite sides of the MEA 10, a pair of gas diffusion layers (an anode gas diffusion layer 16*a* and a cathode gas diffusion layer 16*c*) and a pair of separators (an anode-side separator 18*a* and a cathode-side separator 18*c*) are disposed. The anode gas diffusion layer 16*a* and the cathode gas diffusion layer 16*c* are formed of a member having gas permeability and electron conductivity, for example, a porous carbon member such as carbon cloth or carbon paper.

The anode-side separator 18*a* and the cathode-side separator 18*c* are formed of a member having gas barrier properties and electron conductivity, for example, a gas-impermeable carbon member such as dense carbon obtained by compressing carbon, or a metal member such as stainless steel obtained by press forming. The anode-side separator 18*a* and the cathode-side separator 18*c* have convex-concave portions on surfaces thereof to form a passage for circulating gas. Due to the convex-concave portions, an anode passage 20*a* in which a fuel gas (for example, hydrogen) can be circulated is formed between the anode-side separator 18*a* and the anode gas diffusion layer 16*a*. Due to the convex-concave portions, a cathode passage 20*c* in which an oxidant gas (for example, air) can be circulated is formed between the cathode-side separator 18*c* and the cathode gas diffusion layer 16*c*.

Figure 2:
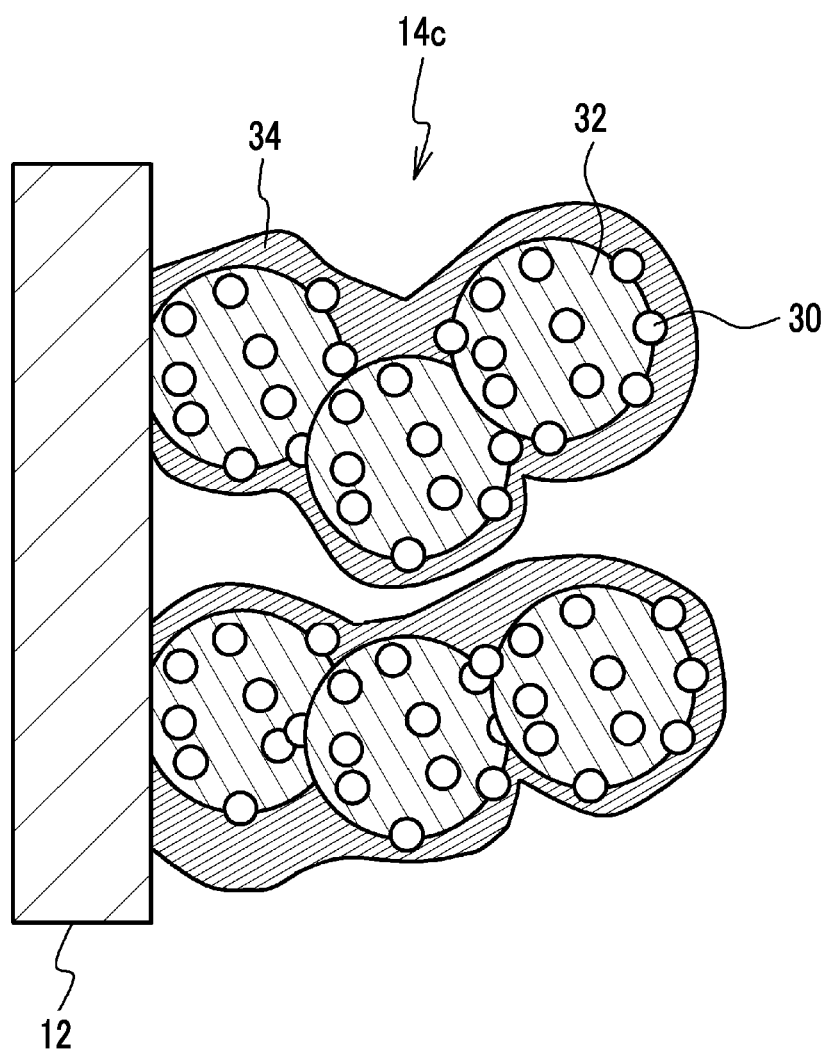
FIG. 2 is an enlarged sectional view showing a part of a cathode catalyst layer.

FIG. 2 is an enlarged sectional view showing a part of the cathode catalyst layer 14*c*. Since the anode catalyst layer 14*a* has the same structure as that of the cathode catalyst layer 14*c*, the description of the anode catalyst layer 14*a* will not be repeated. As shown in FIG. 2, the cathode catalyst layer 14*c* includes: a carbon support 32 on which a catalyst 30 for causing an electrochemical reaction to progress (for example, platinum or a platinum-cobalt alloy) is supported; and an ionomer 34 that has excellent proton conductivity in a wet state. A ratio (I/C) of the weight I of the ionomer 34 to the weight C of the carbon support 32 on which the catalyst 30 is supported is, for example, 0.65 to 0.85.

The carbon support 32 is formed of porous carbon particles. As the porous carbon particles, for example, a carbon compound such as acetylene carbon black, furnace carbon black, graphite, carbon fiber, activated carbon, a crushed product thereof, carbon nanofiber, or carbon nanotube can be used. The ionomer 34 is called a terminal-block type ionomer, and the details thereof will be described below.

The catalyst 30 is supported on an outer surface of the carbon support 32 or in pores thereof. The ionomer 34 is provided on the outer surface of the carbon support 32 or in the pores thereof so as to cover the catalyst 30. Since the ionomer 34 has proton conductivity, protons $H^+$ produced in the anode catalyst layer 14*a* through a chemical reaction of $H_2 \rightarrow 2H^+ + 2e^-$ are transferred to the cathode catalyst layer 14*c* through the electrolyte membrane 12, move through the inside of the ionomer 34, and reach the catalyst 30.

As described above, the ionomer 34 is called a terminal-block type ionomer. The ionomer 34 includes a hydrophilic block and a non-aggregated portion. The hydrophilic block is positioned at a terminal of a random copolymer which includes a hydrophilic portion having a sulfonic acid group and a hydrophobic portion. The hydrophilic block has an aggregated structure of the hydrophilic portion. The non-aggregated portion includes a portion of the random copolymer other than the hydrophilic block. The hydrophilic block is formed by polymerization of a plurality of monomers having a hydrophilic group. In other words, the ionomer 34 includes (i) a polymer chain formed by in random polymerizing a monomer which has a sulfonic acid group and the other monomer and (ii) a hydrophilic block connected at a terminal of the polymer chain. The other monomer has a hydrophobic property after the polymerization.

The polymer chain refers to the random copolymer including the hydrophilic portions (structural units) and the hydrophobic portions (structural units), and the molecular structure of the polymer chain is not limited thereto. For example, the polymer chain may be a polymer having a linear structure, or may be a polymer having a branched structure. In addition, a ratio between the hydrophilic portion and the hydrophobic portion in the polymer chain is not particularly limited. Further, the polymer chain may be a hydrocarbon polymer having only a C—H bond, or may be a fluoropolymer having a C—F bond. In order to obtain high durability, it is preferable that the polymer chain is a polymer (a perfluoropolymer) which has only a C—F bond and does not have a C—H bond.

The hydrophilic portion refers to a minimum repeating unit in a portion of the polymer chain to which a sulfonic acid group is bonded. The hydrophilic portion only has to include a sulfonic acid group at any site thereof, and the structure of a site other than the sulfonic acid group is not particularly limited. The polymer chain may include one kind of hydrophilic portion, or may include two or more kinds of hydrophilic portions.

The hydrophobic portion refers to a minimum repeating unit in a portion of the polymer chain to which an acid group (such as a sulfonic acid group, a carboxylic acid group, or a phosphonic acid group) is not bonded. The structure of the hydrophobic portion is not particularly limited. The polymer chain may include one kind of hydrophobic portion, or may include two or more kinds of hydrophobic portions.

Examples of the hydrophilic portion include compounds represented by the following formulae.

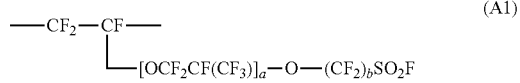

(A1)

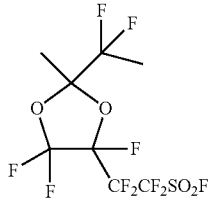

(A2)

In the formulae, a represents an integer of 0 or more, and b represents an integer of 2 or more.

Examples of the hydrophobic portion include compounds represented by the following formulae.

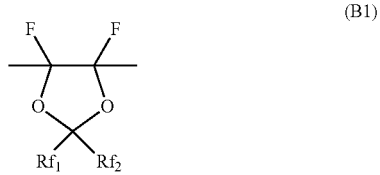

(B1)

(B2)

(B3)

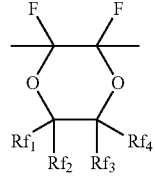

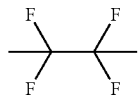

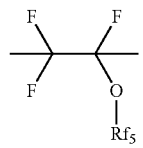

(B4)

In the formulae, $Rf_1$ to $Rf_4$ each independently represent fluorine or a perfluoroalkyl group having 1 to 10 carbon atoms which may have an ether bond in the middle. $Rf_5$ represents a perfluoroalkyl group having 1 to 10 carbon atoms which may have an ether bond in the middle.

Among these, in the terminal-block type ionomer, it is preferable that the hydrophilic portion has a structure represented by Formula (A1) (in particular, a=0 and b=2) and the hydrophobic portion has a structure represented by Formula (B1). The reason for this is that oxygen is likely to permeate due to a decrease in the polymer density and a decrease in activity caused by catalyst poisoning of a sulfonic acid group can be suppressed. In this case, it is preferable that $Rf_1$ and $Rf_2$ each independently represent —$CF_3$. The reason for this is that the reactivity of monomers is increased.

The hydrophilic block refers to the aggregated structure of the hydrophilic portion. The hydrophilic block is positioned at a terminal of the polymer chain. The hydrophilic block may be positioned at only one terminal of the polymer chain, or may be positioned at two or more terminals of the polymer chain. The aggregated structure of the hydrophilic portion can be obtained by polymerization of one kind of hydrophilic monomer or two or more kinds of hydrophilic monomers in the presence of an initiator. The initiator will be described below. The hydrophilic block is formed by repeats of one kind or two or more kinds of hydrophilic portions. The number of repeats of the hydrophilic portion refers to the number of hydrophilic portions (minimum repeating unit) in the hydrophilic block.

The number of repeats of the hydrophilic portion has effects on oxygen permeation and catalyst poisoning of the terminal-block type ionomer. As the number of repeats of the hydrophilic portion increases, oxygen permeation is improved, and catalyst poisoning is decreased. In order to obtain the above-described effects, the number of repeats of the hydrophilic portion is preferably 2 or more, more preferably 5 or more, and still more preferably 11 or more. On the other hand, as the number of repeats of the hydrophilic portion is excessively large, water is likely to locally aggregate, and the power generation performance may deteriorate due to flooding in the vicinity of an output point. Therefore, the number of repeats of the hydrophilic portion is preferably 20 or less, more preferably 18 or less, and still more preferably 16 or less.

Here, the interfacial oxygen permeation resistance, oxygen reduction reaction (ORR) activity, and equivalent weight (EW) of the terminal-block type ionomer will be described.

The interfacial oxygen permeation resistance refers to the resistance measured when oxygen is supplied to the catalyst covered with the ionomer, permeates into the ionomer, and reaches an interface between the ionomer and the catalyst. The interfacial oxygen permeation resistance is expressed by an inverse of a limiting current density measured in a state where the catalyst surface is covered with the ionomer at a thickness of 50 nm to 200 nm. The interfacial oxygen permeation resistance correlates to a current density at an output point (for example, voltage: 0.7 V). As the interfacial oxygen permeation resistance decreases, the current density at an output point increases. The interfacial oxygen permeation resistance of the terminal-block type ionomer is lower than that of an ionomer in the related art. The reason for this is presumed to be as follows. Since the terminal-block type ionomer is adsorbed on the catalyst mainly through the hydrophilic block positioned at a terminal of the terminal-block type ionomer, relatively large gaps are formed in the vicinity of the catalyst surface, and oxygen is likely to be diffused. In a case where the molecular structure of the terminal-block type ionomer is optimized, the interfacial oxygen permeation resistance measured when a surface of a Pt single crystal is covered with the terminal-block type ionomer is $3.8 \times 10^{-4}$ (cm$^2$×atm)/mA or lower. This value corresponds to about 1.5 A/cm$^2$ in terms of the current density at an output point (voltage: 0.7 V).

The oxygen reduction reaction (ORR) activity is the index indicating catalytic performance. Here, the ORR activity is expressed by the current density at 0.82 V (RHE) measured using a rotating disk electrode method. The ORR activity correlates to the voltage at an efficiency point (for example, current density: 0.2 A/cm$^2$). As the ORR activity increases, the voltage at an efficiency point increases. Even in the case of a catalyst having originally high ORR activity, when a surface of the catalyst is poisoned, the ORR activity decreases. The sulfur of the sulfonic acid group poisons the catalyst, which may cause deterioration in catalytic performance. On the other hand, the terminal-block type ionomer is not likely to deteriorate the ORR activity of the catalyst as compared to an ionomer of the related art. The reason for this is presumed to be as follows. Since the terminal-block type ionomer is adsorbed on the catalyst mainly through the hydrophilic block positioned at a terminal of the terminal-block type ionomer, the number of adsorption sites between the sulfonic acid group and the catalyst is reduced. In a case where the molecular structure of the terminal-block type ionomer is optimized, the ORR activity measured when a (111) surface of a Pt single crystal is covered with the terminal-block type ionomer is 24.3 mA/cm$^2$@0.82 V or higher. This value corresponds to about 835 mV in terms of the voltage at an efficiency point (current density: 0.2 A/cm$^2$).

The equivalent weight (EW) can be controlled by adjusting the proportion of the hydrophilic portion in the terminal-block type ionomer and the molecular structures of the hydrophilic portion and the hydrophobic portion. As EW decreases, the proton conductivity becomes higher. On the other hand, as EW is excessively decreased, the ionomer is more likely to dissolve or swell in water. In a case where the molecular structure of the terminal-block type ionomer is optimized, EW is 600 g/mol to 1100 g/mol.

Next, a method of manufacturing the terminal-block type ionomer will be described. The terminal-block type ionomer can be manufactured as follows. First, a hydrophilic monomer including a sulfonic acid group or a precursor thereof is caused to react with an initiator to obtain a reaction solution which includes the hydrophilic block including the aggregated structure of the hydrophilic portion, an unreacted portion of the hydrophilic monomer, and the initiator (first polymerization step).

The hydrophilic monomer refers to a monomer which includes a polymerizable group and a sulfonic acid group (—SO$_3$H) or a precursor thereof bonded to the polymerizable group. Examples of the precursor of the sulfonic acid group include —SO$_2$F and —SO$_2$Cl. The sulfonic acid group or the precursor thereof may be bonded to the polymerizable group directly or through an organic group. The polymerizable group refers to a functional group including a carbon-carbon double bond or a carbon-carbon triple bond. Examples of the polymerizable group include a trifluorovinyl group (CF$_2$=CF—) and a difluoromethylene group (CF$_2$=C<).

Examples of the hydrophilic monomer include compounds represented by the following formulae.

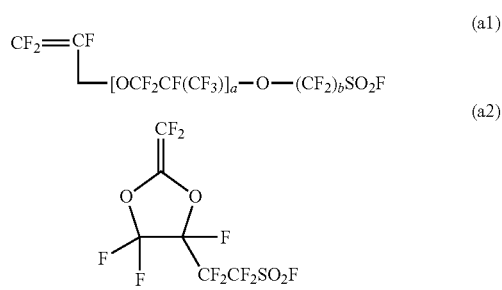

In the formulae, a represents an integer of 0 or more, and b represents an integer of 2 or more.

In order to manufacture the terminal-block type ionomer, among the monomers shown above, one monomer or a combination of two or more monomers may be used as the hydrophilic monomer. Among the monomers, a monomer represented by Formula (a1) is preferable as the hydrophilic monomer for manufacturing the terminal-block type ionomer. The reason for this is that sulfonic acid groups in the molecules and between the molecules are likely to aggregate to form a highly continuous proton path.

The initiator for the polymerization of the hydrophilic monomer is not particularly limited, an initiator which is optimum for the kind of the hydrophilic monomer can be selected. Examples of the initiator include (a) hexafluoropropylene oxide (HFPO) dimer peroxide, (b) CF$_3$CF$_2$CF$_2$C(=O)OOC(=O)CF$_2$CF$_2$CF$_3$ (heptafluorobutyryl peroxide; HFBP), and (c) FSO$_2$CF$_2$(C=O)OOC(=O)CF$_2$SO$_2$F (RFUP).

In the first polymerization step, not all but a portion of the hydrophilic monomer in the reaction solution is caused to react with the initiator. As a result, the reaction solution including the hydrophilic block and the unreacted portion of the hydrophilic monomer is obtained. In this case, in the first polymerization step, it is preferable that the hydrophilic monomer and the initiator are caused to react with each other such that the number of repeats of the hydrophilic portion in the obtained hydrophilic block is 2 to 20. The amount of the hydrophilic block in the reaction solution and the number of repeats of the hydrophilic portion in the hydrophilic block are controlled by adjusting polymerization conditions. As the polymerization time increases, the amount of the hydrophilic block in the reaction solution increases, or the number of repeats of the hydrophilic portion in the hydrophilic block increases. In order to form an appropriate amount of the hydrophilic block having an appropriate number of repeats of the hydrophilic portion, the polymerization time is preferably 15 minutes or longer, more preferably 20 minutes or longer, and still more preferably 30 minutes or longer. On the other hand, as the polymerization time is excessively long, the amount of the hydrophilic block in the reaction solution becomes excessively large, or the number of repeats of the hydrophilic portion in the hydrophilic block becomes excessively large. Therefore, the polymerization time is preferably 2 hours or shorter, more preferably 1.5 hours or shorter, and still more preferably 1 hour or shorter. In addition, in a case where the temperature of the reaction solution during the reaction of the hydrophilic monomer and the initiator is excessively low, the polymerization reaction is not performed within an actual period of time. Therefore, the temperature of the reaction solution is preferably −80° C. or higher and more preferably −70° C. or higher. On the other hand, in a case where the temperature of the reaction solution is excessive high, the polymerization reaction is performed to an excessive degree. Therefore, the temperature of the reaction solution is preferably 40° C. or lower and more preferably 25° C. or lower.

Next, a hydrophobic monomer is further added to the reaction solution, and the hydrophilic monomer and the hydrophobic monomer are further copolymerized by using the hydrophilic block as an initiator (second polymerization step).

The hydrophobic monomer refers to a monomer which includes a polymerizable group and does not include an acid group (for example, a sulfonic acid group, a carboxylic acid group, or a phosphonic acid group) in the structure thereof. The structure of the hydrophobic monomer is not particularly limited, and a monomer which is optimum for the purpose can be used.

Examples of the hydrophobic monomer include compounds represented by the following formulae.

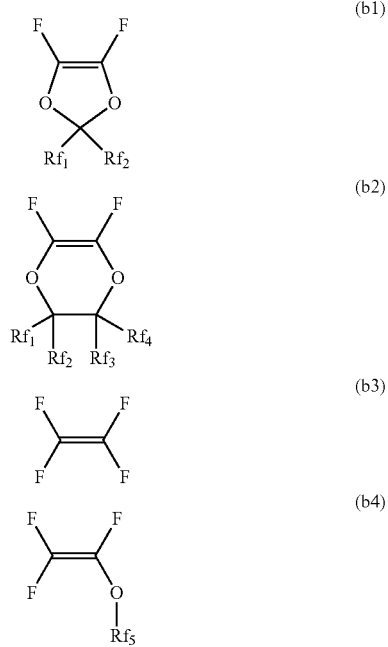

In the formulae, $Rf_1$ to $Rf_4$ each independently represent fluorine or a perfluoroalkyl group having 1 to 10 carbon atoms which may have an ether bond in the middle. $Rf_5$ represents a perfluoroalkyl group having 1 to 10 carbon atoms which may have an ether bond in the middle.

In order to manufacture the terminal-block type ionomer, among the monomers shown above, one monomer or a combination of two or more monomers may be used as the hydrophobic monomer. Among the monomers, a monomer represented by Formula (b1) is preferable as the hydrophobic monomer for manufacturing the terminal-block type ionomer. The reason for this is that the monomer has a bulky molecular structure and thus exhibits high oxygen permeation. In this case, it is preferable that $Rf_1$ and $Rf_2$ each independently represent —$CF_3$. The reason for this is that the reactivity of monomers is increased.

In a case where the hydrophobic monomer is further added to the reaction solution to react with each other, the hydrophilic monomer and the hydrophobic monomer are further copolymerized by using the hydrophilic block as an initiator. As a result, the terminal-block type ionomer or a precursor thereof is obtained. Polymerization conditions are not particularly limited and may be conditions where the reaction between the hydrophilic block, the hydrophilic monomer, and the hydrophobic monomer is efficiently performed.

In a case where a monomer including a precursor of a sulfonic acid group is used as the hydrophilic monomer, a precursor of the terminal-block type ionomer is obtained. In this case, the obtained precursor is hydrolyzed and cleaned with an acid to obtain an acidic form. A method and conditions for the hydrolysis and the acid cleaning are not particularly limited, and a method and conditions which are optimum for the kind of the hydrophilic monomer can be selected.

In a case where an electrolyte is synthesized from the hydrophilic monomer and the hydrophobic monomer, only the hydrophilic monomer is partially polymerized first, and then the hydrophobic monomer is added and further polymerized. In this case, the terminal-block type ionomer in which the hydrophilic block having an appropriate size is positioned at a terminal of the polymer chain of the random copolymer including the hydrophilic portions and the hydrophobic portions is obtained.

Next, molecular structures of a both-terminal-block type ionomer, a single-terminal-block type ionomer, and a random type ionomer will be described, and then the results of a simulation in which each of the ionomers is disposed on a Pt single crystal to obtain a relationship between the distance from a surface of the Pt single crystal and the ionomer density at that position will be described. FIG. 3A shows the molecular structure of the random type ionomer, FIG. 3B shows the molecular structure of the both-terminal-block type ionomer, and FIG. 3C shows the molecular structure of the single-terminal-block type ionomer. In the random type ionomer, 20 hydrophobic portions and 10 hydrophilic portions are randomly bonded to each other. In the both-terminal-block type ionomer, a polymer chain is formed by 20 repeats of the hydrophobic portion, and a hydrophilic block including 5 repeats of the hydrophilic portion is positioned at both terminals thereof. In the single-terminal-block type ionomer, a polymer chain is formed by 20 repeats of the hydrophobic portion, and a hydrophilic block including 10 repeats of the hydrophilic portion is positioned at a single terminal thereof. Regarding all the random type ionomer, the both-terminal-block type ionomer, and the single-terminal-block type ionomer, the molecular weight is about 6000, and EW is about 800. As shown in FIGS. 3A to 3C, the molecular structure of the random type ionomer is linear; on the other hand, the molecular structures of the terminal-block type ionomers are curved.

Figure 4:
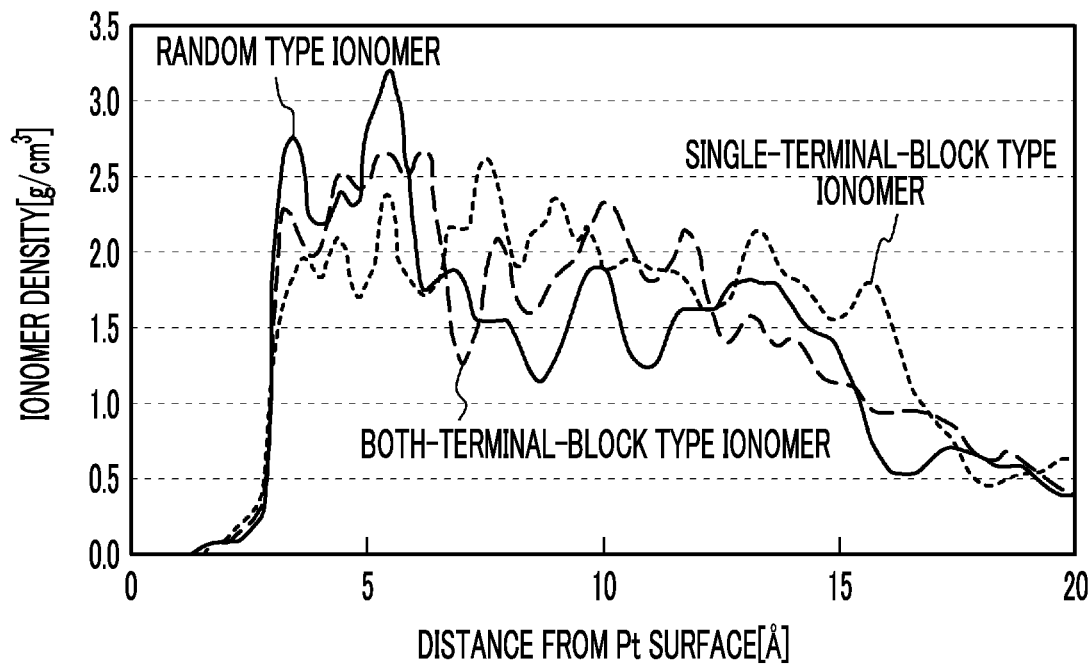
FIG. 4 is a graph showing an ionomer density in the vicinity of an interface between a Pt single crystal and an ionomer.

FIG. 4 is a graph showing an ionomer density in the vicinity of an interface between a Pt single crystal and each of the ionomers. Table 1 shows the cumulative mass of each of the ionomers from a surface of the Pt single crystal.

TABLE 1

| | Cumulative Mass [g] from Pt Surface | |
|---|---|---|
| | 5 angstroms | 7 angstroms |
| Random Type Ionomer | 52.1 | 98.5 |
| Both-Terminal-Block Type Ionomer | 49.2 | 94.1 |
| Single-Terminal-Block Type Ionomer | 41.2 | 80.7 |

As shown in FIG. 4, in a region at a distant of 5 angstroms or less from a surface of the Pt single crystal, the ionomer density values are as follows: random type ionomer>both-terminal-block type ionomer>single-terminal-block type ionomer. As shown in Table 1, the cumulative mass values have same tendency as described above. The results show that, by forming the hydrophilic block having a larger size at a terminal of the polymer chain, oxygen permeation can be improved, and deterioration in catalytic performance can be suppressed.

Next, the evaluation of a terminal-block type ionomer A prepared as described below will be described. First, the hydrophilic monomer (a=0, b=2) represented by Formula (a1) was put into an autoclave and was cooled to −80° C. Next, pressure reduction and nitrogen filling were repeated to remove oxygen. Next, 0.01 mol % of an initiator (HFBP) was added, and the content was stirred for 30 minutes. Next, perfluorodimethyldioxysol (PDD) in which $Rf_1$ and $Rf_2$ in Formula (b1) each independently represent —$CF_3$ was added into the solution, the solution was heated to room temperature, and then the reaction was continuously performed for 72 hours. A molar ratio of the hydrophilic monomer to PDD was 3:1. After vacuum drying, the obtained solid was hydrolyzed with a sodium hydroxide aqueous solution and was cleaned with hydrochloric acid. As a result, a terminal-block type ionomer A having an acidic form was prepared.

In addition, for comparison, a random type ionomer B prepared as described below and a commercially available ionomer C were also evaluated. First, an autoclave was cooled with dry ice after nitrogen purge, and then PDD and the hydrophilic monomer (a=0, b=2) represented by Formula (a1) were put thereinto in this order. Finally, an initiator (HFPO dimer peroxide) was put into the autoclave. The content was heated to room temperature while being magnetically stirred, and the reaction was continuously performed for 72 hours. Next, an additional initiator (1 mL of an HFPO dimer peroxide solution) was further added. As a result, the random type ionomer B was prepared. In addition, as the commercially available ionomer C, a NAFION (registered trade name; hereinafter, the same shall be applied) solution (DE2020) was used without any change.

By using any one of the terminal-block type ionomer A, the random type ionomer B, and the commercially available ionomer C (NAFION) as an ionomer of a cathode catalyst layer, a MEA was prepared, and the MEA performance was evaluated. Regarding the MEA performance, a voltage value at an efficiency point (current density: 0.2 A/cm²) and a current density at an output point (voltage: 0.7 V) were evaluated. In addition, a thin film (desired thickness: 35 nm) of the ionomer was formed on a (111) surface of a Pt single crystal to prepare a sample. Regarding this sample, a cyclic voltammogram (CV) in perchloric acid and oxygen reduction reaction (ORR) activity under oxygen saturation conditions were measured using a three-electrode rotating disk electrode method (hanging meniscus method). In addition, the ionomer was applied to a Pt single crystal in a thickness of 50 nm to 200 nm to prepare a sample. Regarding this sample, the limiting current density was measured under conditions of 80° C. and 60% RH. An inverse of the obtained limiting current density was set as an interfacial oxygen permeation resistance.

Figure 5:
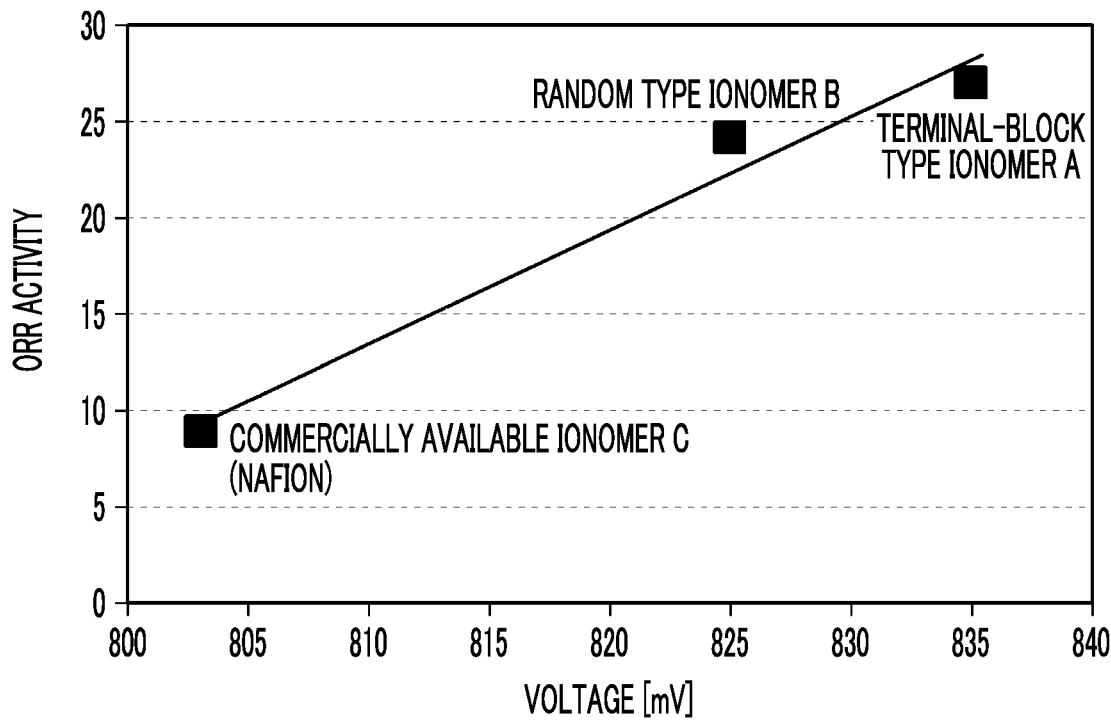
FIG. 5 is a graph showing a relationship between a voltage at an efficiency point and an ORR activity.
Figure 6:
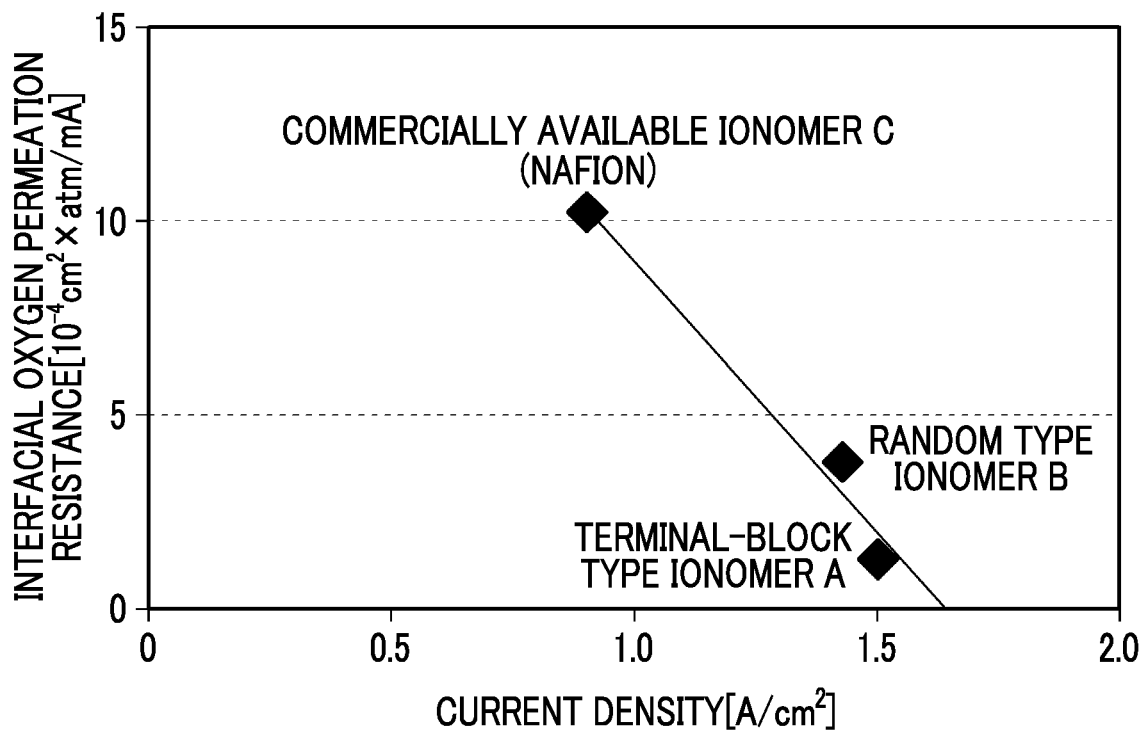
FIG. 6 is a graph showing a relationship between a current density at an output point and an interfacial oxygen permeation resistance.

Table 2 shows the results of measuring the MEA performance and the ORR performance. FIG. 5 is a graph showing a relationship between a voltage at an efficiency point and an ORR activity. FIG. 6 is a graph showing a relationship between a current density at an output point and an interfacial oxygen permeation resistance.

TABLE 2

| | | MEA Performance | | Ionomer Performance | |
|---|---|---|---|---|---|
| | | | | Interfacial Oxygen | |
| | Ionomer EW [g/mol] | Efficiency Point [mV] | Output Point [A/cm²] | Permeation Resistance [$10^{-4}$ cm$^{-2}$ atm/mA] | Pt (111) ORR Activity |
| Terminal-Block Type Ionomer A | 818 | 835 | 1.50 | 1.35 | 27.0 |
| Random Type Ionomer B | 740 | 825 | 1.43 | 3.82 | 24.2 |
| Commercially Available Ionomer C (NAFION) | 980 | 803 | 0.90 | 10.2 | 8.98 |

As shown in Table 2, EW values were as follows: random type ionomer B<terminal-block type ionomer A<commercially available ionomer C (NAFION). The MEA performances were significantly different from each other between the terminal-block type ionomer A, the random type ionomer B, and the commercially available ionomer C (NAFION). The voltage at an efficiency point and the current density at an output point were as follows: terminal-block type ionomer A>random type ionomer B>>commercially available ionomer C (NAFION).

The ORR activity of the random type ionomer B was significantly higher than that of the commercially available ionomer C (NAFION). The reason for this is presumed to be that, in the ionomer having the (B1) structure, a main chain is stiffer and the sulfonic acid group is less likely to be adsorbed on the catalyst as compared to the ionomer having the (B3) structure. In addition, the ORR activity of the terminal-block type ionomer A was higher than that of the random type ionomer B. The reason for this is presumed to be that, since the ionomer was adsorbed on the catalyst mainly through the hydrophilic block formed at the terminal of the polymer chain, the number of sulfonic acid groups adsorbed on the catalyst surface was decreased. It was found from FIG. 5 that there is a positive correlation between the voltage at an efficiency point and the ORR activity. In order to increase the MEA efficiency, it was found that the improvement of the ORR activity is important.

The interfacial oxygen permeation resistance of the random type ionomer B was significantly lower than the commercially available ionomer C (NAFION). The reason for this is presumed to be that oxygen was likely to be diffused by introducing a bulky molecular structure (dioxisol ring) into the polymer chain. In addition, the interfacial oxygen permeation resistance of the terminal-block type ionomer A was lower than that of the random type ionomer B. The reason for this is presumed to be that, since the ionomer was adsorbed on the catalyst mainly through the hydrophilic block formed at the terminal of the polymer chain, the ionomer density in the vicinity of an interface between the catalyst and the ionomer was decreased. It was found from FIG. 6 that there is a negative correlation between the current density at an output point and the interfacial oxygen permeation resistance. In order to obtain a high output, it was found that the improvement of the oxygen permeation of the ionomer is important.

Next, the terminal-block type ionomer A and the commercially available ionomer C (NAFION) were cast to obtain a cast film. The cast film was analyzed by differential scanning calorimetry (DSC). In addition, from a DSC curve of a temperature rise, an amount $W_f$ of bulk water was obtained using the following Expression (1), and an amount $W_{fc}$ of freezable water clusters (lower melting point water) was obtained using the following Expression (2). Next, the amount $W_f$ of bulk water and the amount $W_{fc}$ of lower melting point water were subtracted from a total amount $W_t$ of water to obtain the amount $W_{nf}$ of non-freezing water (Expression (3)). Here, m represents the dry weight of a sample, dq/dt represents a heat flux signal of DSC, and $\Delta H_0$ represents fusion enthalpy at $T_0$ ($T_0$ represents a melting point of bulk water).

$$W_f = \int_{T_0}^{\prime T_0} \frac{\frac{dq}{dt}}{m\Delta H_0} dt \quad (1)$$

$$W_{fc} = \int_{\langle T_0}^{\prime T_0} \frac{\frac{dq}{dt}}{m\Delta H(T)} dt \quad (2)$$

$$W_{nf} = W_t - W_f - W_{fc} \quad (3)$$

Figure 7:
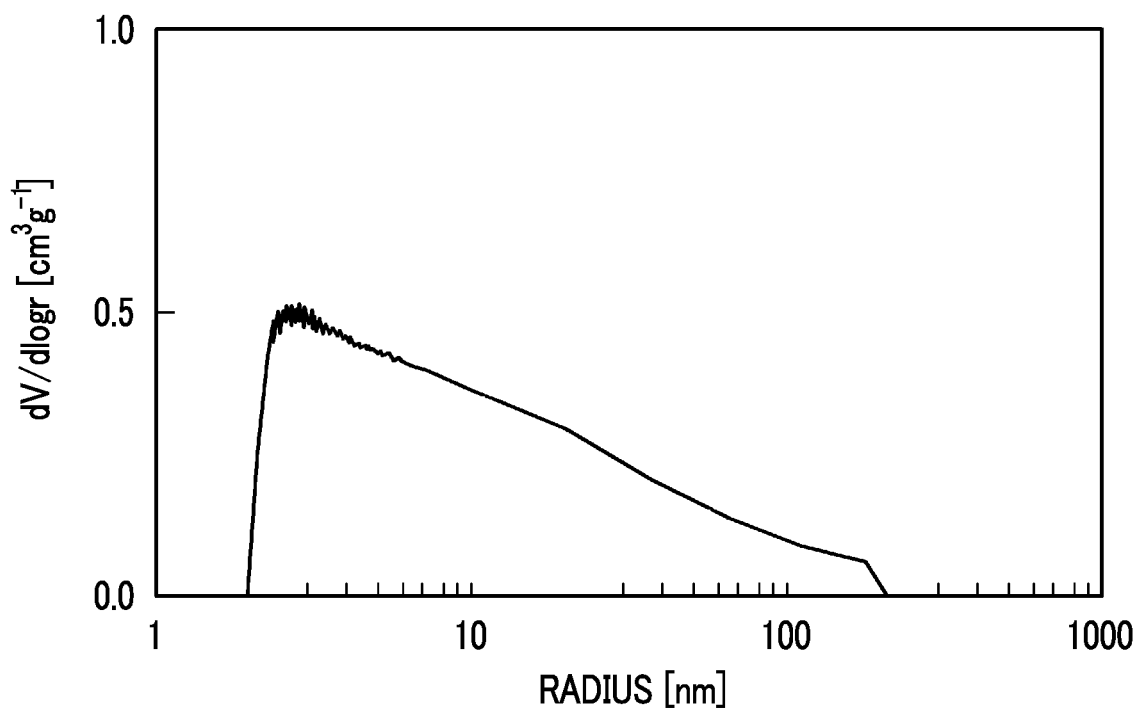
FIG. 7 is a graph showing a cluster radius distribution curve which is obtained by analyzing a cast film of a terminal-block type ionomer by differential scanning calorimetry.

FIG. 7 is a graph showing a cluster radius distribution curve which is obtained by analyzing the cast film of the terminal-block type ionomer A by DSC. Table 3 shows a cluster diameter distribution and a water content of the terminal-block type ionomer A. In Table 3, the primary average radius refers to the number average radius. The lower melting point water content refers to the content of water which melts at −55° C. to 0° C. The non-freezing water content refers to the content of water which does not freeze up to −55° C. The water content in a sample refers to the sum of the lower melting point water content and the non-freezing water content (lower melting point water content+non-freezing water content).

TABLE 3

| | Cluster Diameter Distribution | | Water Content | | |
|---|---|---|---|---|---|
| | Primary Average Radius [nm] | Cluster Volume [cm³/g] | Lower melting point water content [dry %] | Non-Freezing Water Content [dry %] | Water Content in Sample [dry %] |
| Terminal-Block Type Ionomer A | 4 | 0.6 | 38 | 22 | 60 |

As shown in Table 3, the lower melting point water content of the terminal-block type ionomer A was high at 38 dry %. The reason why the lower melting point water content of the terminal-block type ionomer A was high is presumed to be as follows. The hydrophilic block formed by repeats of the hydrophilic portion having a sulfonic acid group is positioned at the terminal, and the hydrophilic block has a structure where the sulfonic acid groups are arranged continuously. Therefore, a large amount of water molecule can be attracted. Accordingly, it can be said that the lower melting point water content of a terminal-block type ionomer other than the terminal-block type ionomer A prepared using the above-described method is also high. The lower melting point water is present in a free volume portion (for example, a gap in a cyclic portion of a hydrophobic group) of a polymer and is highly mobile. Therefore, it is presumed that, as the lower melting point water content increases, the inside or vicinity of the polymer is more likely to be wet. Therefore, it can be said that the terminal-block type ionomer has higher water retention than the random type ionomer. The terminal-block type ionomer has high water retention. Therefore, by using the terminal-block type ionomer as the ionomer 34 of the cathode catalyst layer 14c, the cathode catalyst layer 14c is not likely to be dry, and a decrease in the utilization rate of the catalyst 30 can be suppressed.

Figure 8:
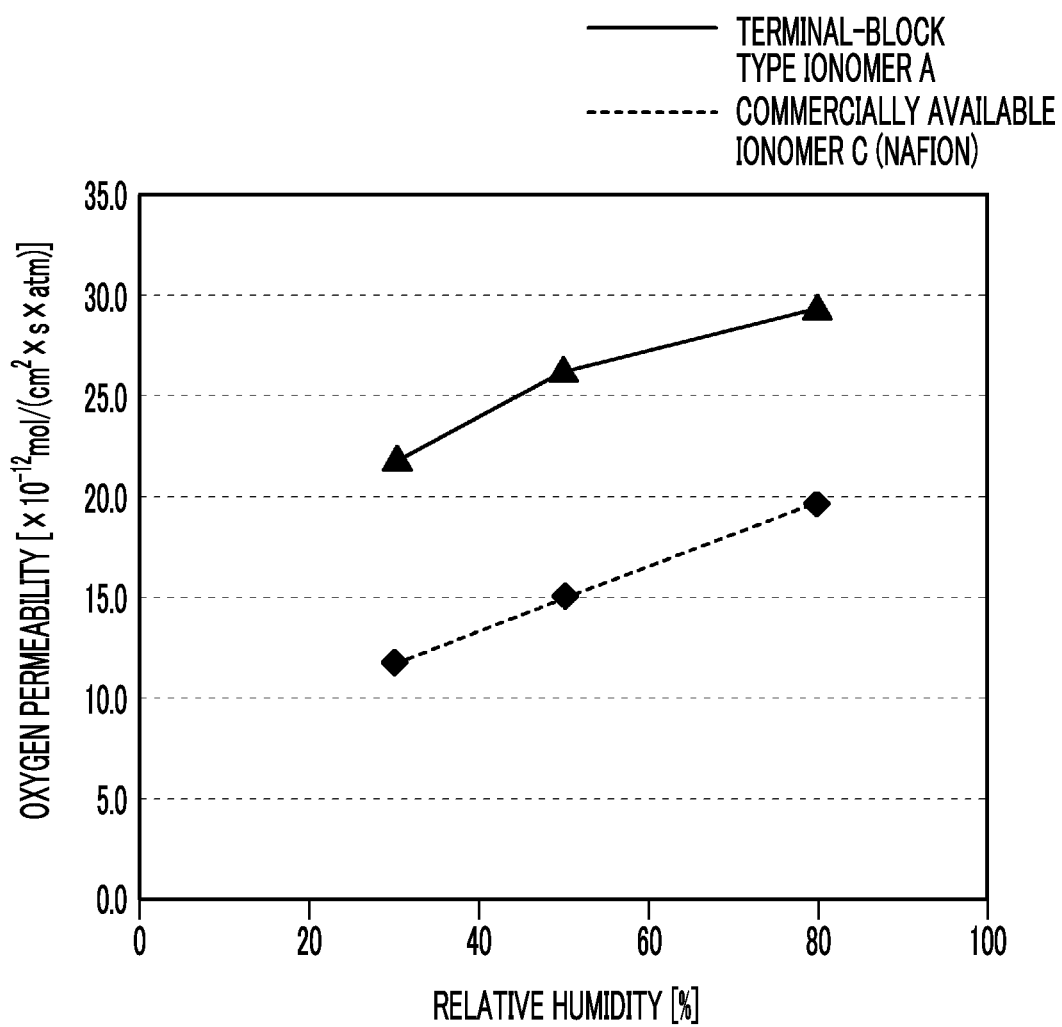
FIG. 8 is a graph showing a relationship between a relative humidity and an oxygen permeability.

In addition, the oxygen permeability of the above-described cast film was measured. The oxygen permeability was obtained by obtaining an oxygen diffusion coefficient and an oxygen solubility of the cast film and multiplying the obtained values by each other. FIG. 8 is a graph showing a relationship between a relative humidity and an oxygen permeability. As shown in FIG. 8, the oxygen permeability of the terminal-block type ionomer A was higher than that of the commercially available ionomer C (NAFION) and was $22 \times 10^{-12}$ mol/(cm²×s×atm) at 30% RH, $26 \times 10^{-12}$ mol/(cm²×s×atm) at 50% RH, and $29 \times 10^{-12}$ mol/(cm²×s×atm) at 80% RH. The reason why the oxygen permeability of the terminal-block type ionomer A is high is presumed to be as follows. Since the ionomer structure is curved, gaps are likely to be formed in the ionomer, and the area of a free volume portion in a polymer is large. Accordingly, it can be said that the oxygen permeability of a terminal-block type ionomer other than the terminal-block type ionomer A prepared using the above-described method is also high. The terminal-block type ionomer has high water retention. Therefore, in a case where the terminal-block type ionomer is used as the ionomer 34 of the cathode catalyst layer 14c, air may be insufficiently supplied to the catalyst 30 due to liquid water present in the ionomer. However, the terminal-block type ionomer also has high oxygen permeability. Therefore, even in a case where the terminal-block type ionomer is used as the ionomer 34 of the cathode catalyst layer 14c, a decrease in the amount of air supplied into the catalyst 30 can be suppressed. The oxygen permeability of the terminal-block type ionomer at 30% RH is preferably $20 \times 10^{-12}$ mol/(cm²×s×atm) or higher, more preferably $22 \times 10^{-12}$ mol/(cm²×s×atm) or higher, and still more preferably $25 \times 10^{-12}$ mol/(cm²×s×atm) or higher.

Next, the power generation performance of the fuel cell 100 will be described. An ionomer prepared as described below was used as the ionomer 34 of the cathode catalyst layer 14c. First, the terminal-block type ionomer A was prepared using the above-described method. Specifically, the hydrophilic monomer (a=0, b=2) represented by Formula (a1) was put into an autoclave and was cooled to −80° C. Next, pressure reduction and nitrogen filling were repeated to remove oxygen. Next, 0.01 mol % of an initiator (HFBP) was added, and the content was stirred for 0.5 hours. Next, PDD was added into the solution, the solution was heated to room temperature, and then the reaction was continuously performed for 72 hours. A molar ratio of the hydrophilic monomer to PDD was 3:1. After vacuum drying, the obtained solid was hydrolyzed with a sodium hydroxide aqueous solution and was cleaned with hydrochloric acid. As a result, a terminal-block type ionomer A having an acidic form was prepared. In addition, a terminal-block type ionomer D was prepared using the same method as described above, except that the stirring time during the preparation was changed to 1 hour. Further, a random type ionomer E was prepared using the same method as described above, except that the content was not stirred during the preparation.

Tables 4 shows the lower melting point water content and the number of repeats of the hydrophilic portion in the hydrophilic block regarding each of the terminal-block type ionomer A, the terminal-block type ionomer D, and the random type ionomer E. The number of repeats of the hydrophilic portion can be calculated by measuring a molecular weight Ma of an acid polymer in a reaction solution, to which the hydrophobic monomer is not added, and dividing Ma by a molecular weight Mb of an acid monomer which is one unit included in the acid polymer (Ma/Mb).

TABLE 4

| | Stirring Time [h] | Lower melting point water content [dry %] | Number of Repeats of Hydrophilic Portion |
|---|---|---|---|
| Terminal-Block Type Ionomer D | 1 | 38 | 12.9 |
| Terminal-Block Type Ionomer A | 0.5 | 28 | 13.9 |
| Random Type Ionomer E | 0 | — | — |

It can be seen from Table 4 that, as the stirring time increases, the lower melting point water content increases. The hydrophilic portion contributes to water retention. Therefore, as the lower melting point water content increases, the number of repeats of the hydrophilic portion should be increased. However, Table 4 shows the opposite results. The reason for this is presumed to be an error in measurement precision.

The power generation performance of a fuel cell was measured in which each of the terminal-block type ionomer A, the terminal-block type ionomer D, the random type ionomer E, and the commercially available ionomer C (NAFION: DE2020) was used as the ionomer 34 of the cathode catalyst layer 14c. A fuel cell in which the terminal-block type ionomer A was used was used in Example 1, a fuel cell in which the terminal-block type ionomer D was used was used in Example 2, a fuel cell in which the random type ionomer E was used was used in Comparative Example 1, and a fuel cell in which the commercially available ionomer C (NAFION) was used was used in Comparative Example 2. The power generation performance was measured under conditions of temperature: 65° C. (both electrodes not humidified) and back pressure: 210 kPa·abs. In addition, in each of Examples 1 and 2 and Comparative Examples 1 and 2, the gas diffusion resistance coefficient of the cathode gas diffusion layer 16c was $3.2 \times 10^{-4}$ m, and a ratio (I/C) of the weight I of the ionomer 34 to the weight C of the carbon support 32 on which the catalyst 30 was supported was 0.75. The thickness of the electrolyte membrane 12 was 10 μm, 0.05 mg/cm² of the catalyst 30 formed of Pt was adsorbed on the carbon support 32 in the anode catalyst layer 14a, and 0.2 mg/cm² of the catalyst 30 formed of a Pt—Co alloy was adsorbed on the carbon support 32 in the cathode catalyst layer 14c. The gas diffusion resistance coefficient is a value correlating to the gas diffusion resistance which is an index value indicating gas diffusion hardness, and is expressed by the following Expression (4). The porosity of the gas diffusion layer in Expression (4) refers to a ratio of the pore volume excluding the volume of a gas diffusion layer base material to the total volume of the gas diffusion layer. The gas diffusion layer having a gas diffusion resistance coefficient of $3.2 \times 10^{-4}$ m will also be referred to as "diffusion layer G".

$$\text{Gas Diffusion Resistance Coefficient} = \frac{\text{Thickness of Gas Diffusion Layer}}{(\text{Porosity of Gas Diffusion Layer})^4} \quad (4)$$

Figure 9:
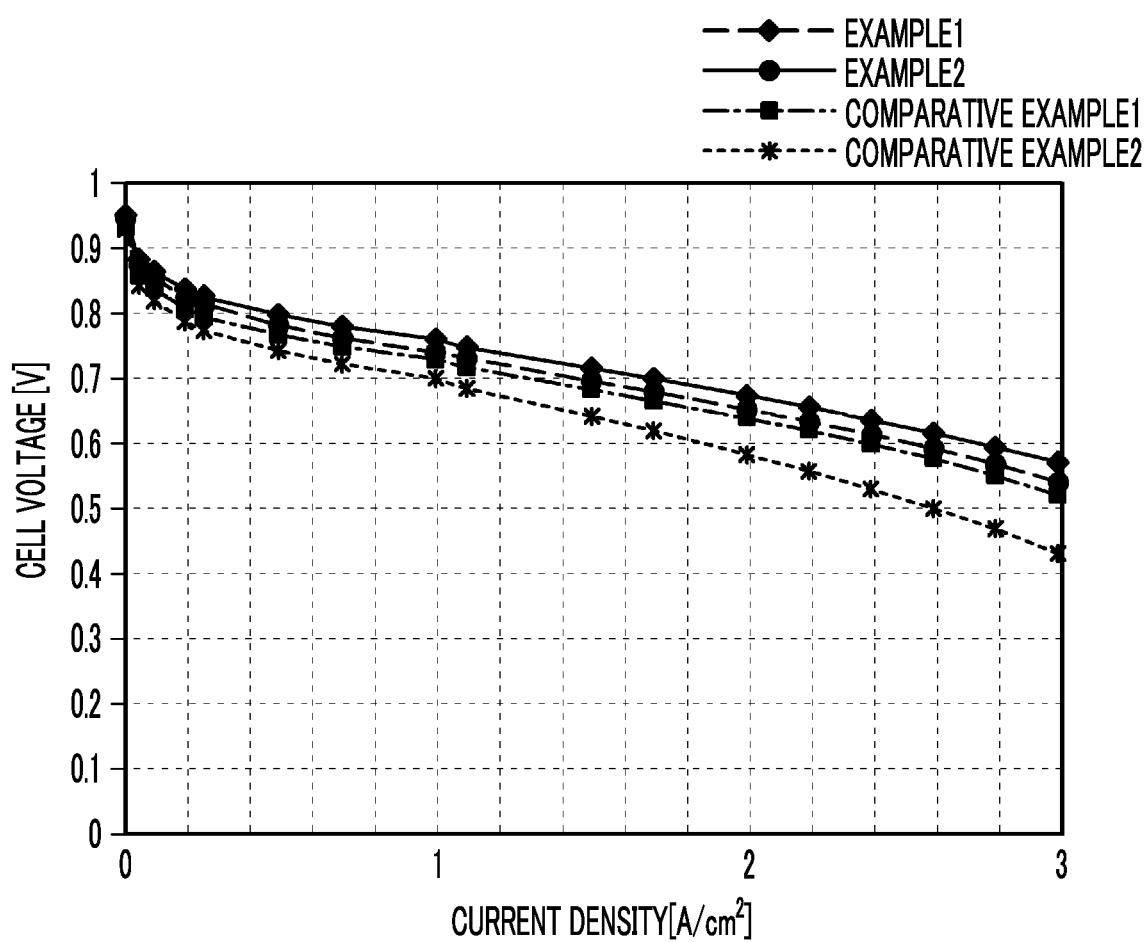
FIG. 9 is a graph showing the results of measuring power generation performances of Examples 1 and 2 and Comparative Examples 1 and 2.

FIG. 9 is a graph showing the results of measuring power generation performances of Examples 1 and 2 and Comparative Examples 1 and 2. The measurement result of Example 1 (in which the terminal-block type ionomer A was used) is indicated by a broken line, the measurement result of Example 2 (in which the terminal-block type ionomer D was used) is indicated by a solid line, the measurement result of Comparative Example 1 (in which the random type ionomer E was used) is indicated by a chain line, and the measurement result of Comparative Example 2 (in which the commercially available ionomer C (NAFION) was used) is indicated by a dotted line.

As shown in FIG. 9, in Examples 1 and 2 in which the terminal-block type ionomer was used, the power generation performance was improved during a low load (low output) operation and a high load (high output) operation, as compared to Comparative Example 1 in which the random type ionomer was used and Comparative Example 2 in which NAFION was used. As described above, since the terminal-block type ionomer has high water retention, the drying of the cathode catalyst layer 14c can be suppressed. Therefore, a decrease in the utilization rate of the catalyst 30 in the cathode catalyst layer 14c can be suppressed. As a result, it is presumed that the power generation performance during a low load operation can be improved. In addition, as described above, since the oxygen permeability of the terminal-block type ionomer is high, a decrease in the amount of air supplied into the catalyst 30 can be suppressed. As a result, it is presumed that the power generation performance during a high load operation can be improved.

Figure 10:
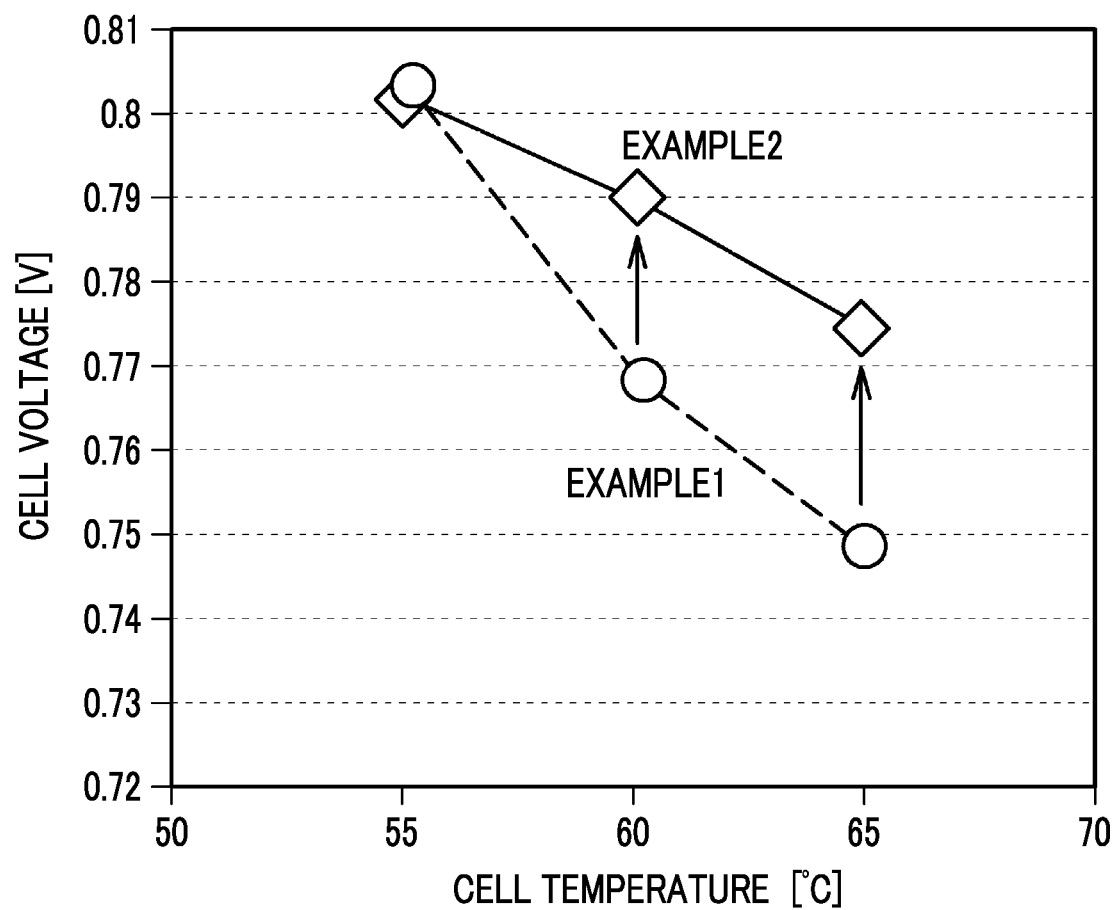
FIG. 10 is a graph showing a relationship between a cell temperature and a cell voltage at an efficiency point in fuel cells according to Example 1 and Example 2.

In addition, the lower melting point water content in the terminal-block type ionomer D used in Example 2 was higher than that of the terminal-block type ionomer A used in Example 1. Therefore, it can be seen that, as the lower melting point water content increases, the power generation performance can be improved. FIG. 10 is a graph showing a relationship between a cell temperature and a cell voltage at an efficiency point (current density: 0.2 A/cm$^2$) in the fuel cells according to Example 1 and Example 2. It can be seen from FIG. 10 that, in Example 2 in which the ionomer having a high lower melting point water content was used, the power generation performance during a low load operation was improved as compared to Example 1 in which the ionomer having a low lower melting point water content was used. For example, in a case where the cell temperature was 60° C., the cell voltage in Example 2 was higher than that in Example 1 by 20 mV. This value corresponds to 1.6 times in terms of catalytic activity.

Next, the power generation performances of the fuel cells will be described in which the terminal-block type ionomer D was used as the ionomer 34 of the cathode catalyst layer 14c and in which the gas diffusion resistance coefficients of the cathode gas diffusion layers 16c were different from each other. The power generation performances of Example 2 and 3 and Comparative Examples 3 and 4 were measured. In Example 2, the diffusion layer G having a gas diffusion resistance coefficient of 3.2×10$^{-4}$ m was used as the cathode gas diffusion layer 16c. In Example 3, a diffusion layer b having a gas diffusion resistance coefficient of 2.2×10$^{-4}$ m was used as the cathode gas diffusion layer 16c instead of the diffusion layer of the Example 2. In Comparative Example 3, a diffusion layer c having a gas diffusion resistance coefficient of 3.8×10$^{-4}$ m was used as the cathode gas diffusion layer 16c instead of the diffusion layer of the Example 2. In Comparative Example 4, a diffusion layer d having a gas diffusion resistance coefficient of 4.7×10$^{-4}$ m was used as the cathode gas diffusion layer 16c instead of the diffusion layer of the Example 2.

Figure 11:
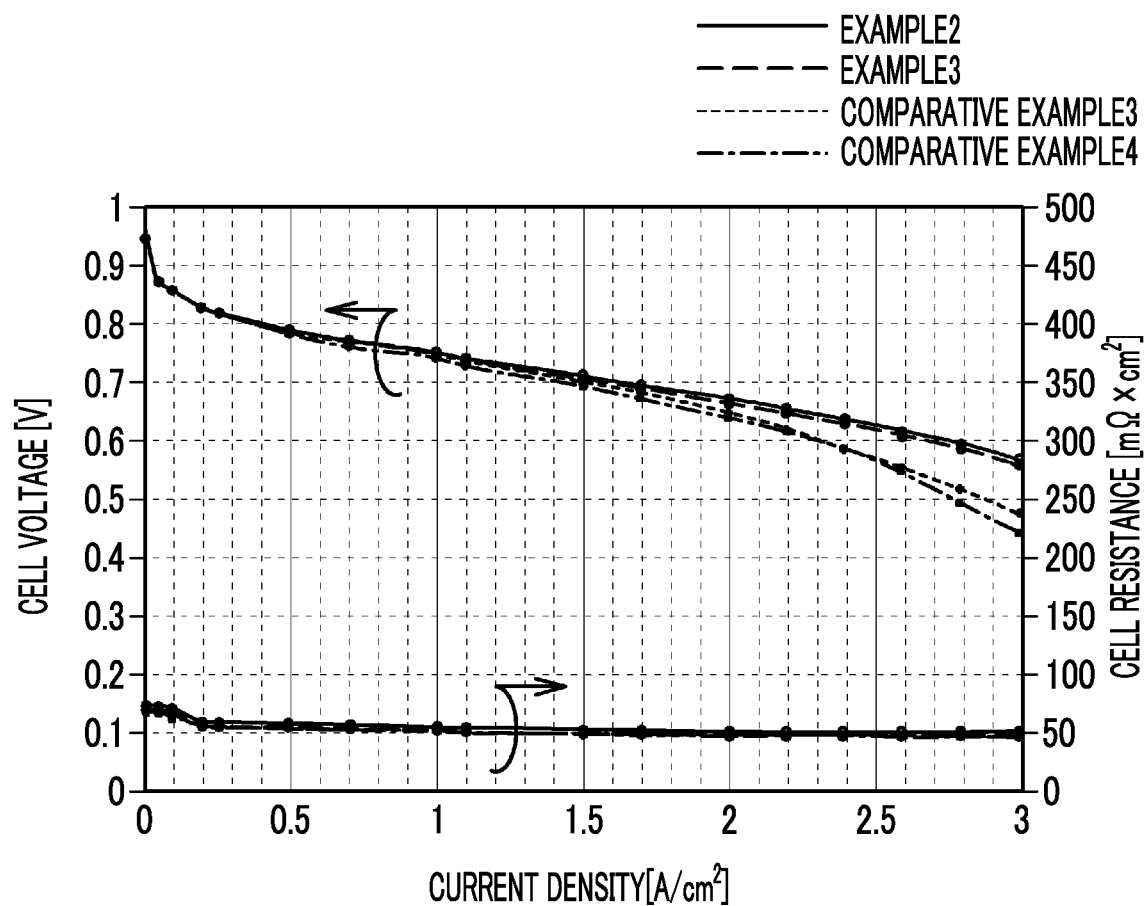
FIG. 11 is a graph showing the results of measuring power generation performances of Examples 2 and 3 and Comparative Examples 3 and 4.

FIG. 11 is a graph showing the results of measuring power generation performances of Examples 2 and 3 and Comparative Examples 3 and 4. The measurement results of Example 2 is indicated by a solid line, the measurement results of Example 3 is indicated by a broken line, the measurement results of Comparative Example 3 is indicated by a dotted line, and the measurement results of Comparative Example 4 is indicated by a chain line. As shown in FIG. 11, the cell voltages of Comparative Example 3 and 4 in a high current range were significantly lower than those of Examples 2 and 3.

Figure 12:
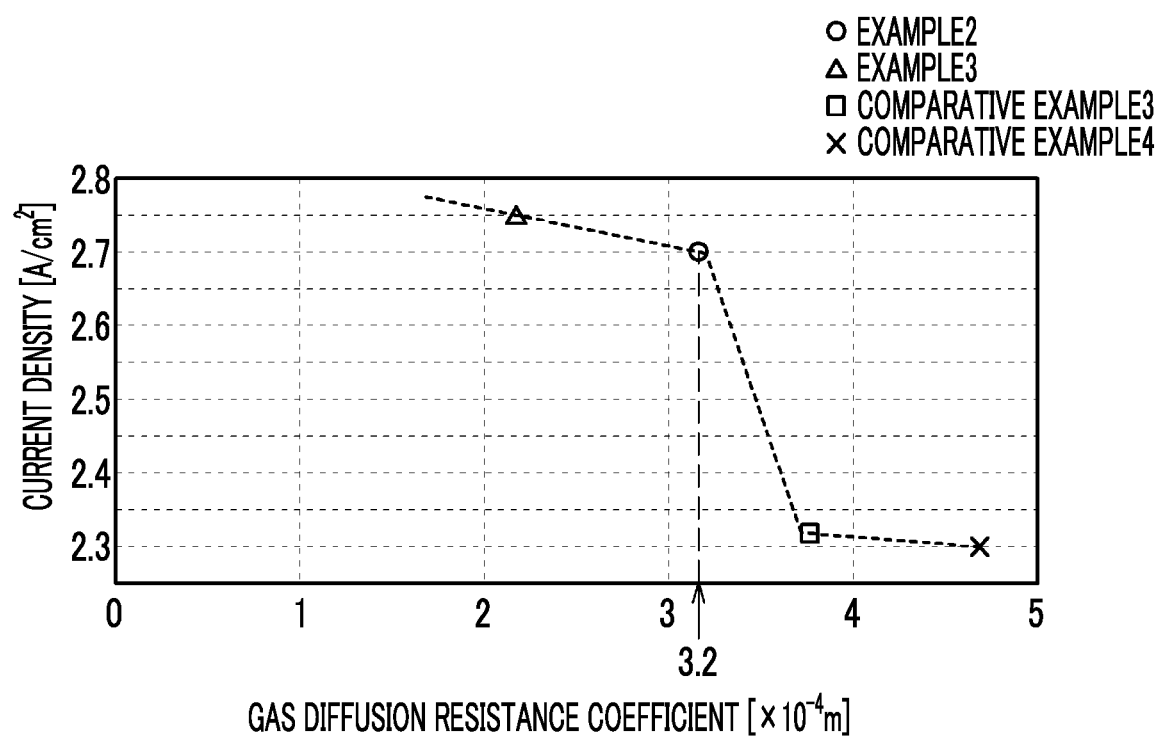
FIG. 12 is a graph showing a relationship between a current density and a gas diffusion resistance coefficient at a cell voltage of 0.6 V in FIG. 11.

FIG. 12 is a graph showing a relationship between a current density and a gas diffusion resistance coefficient at a cell voltage of 0.6 V in FIG. 11. Example 2 is indicated by a circle, Example 3 is indicated by a triangle, Comparative Example 3 is indicated by a square, and Comparative Example 4 is indicated by a cross. It can be seen from FIG. 12 that, in a case where the gas diffusion resistance coefficient of the cathode gas diffusion layer 16c is higher than 3.2×10$^{-4}$ m, the current density at a cell voltage of 0.6 V is significantly decreased. It is presumed that, in a case where the gas diffusion resistance coefficient is higher than 3.2×10$^{-4}$ m, the power generation performance during a high load operation significantly deteriorates because concentration overvoltage occurs due to delayed air supply. Therefore, FIG. 12 shows the measurement results in a case where the terminal-block type ionomer D in which the lower melting point water content in the ionomer 34 was 38 dry % was used. However, it can be said that, even when the lower melting point water content is a value other than 38 dry %, in a case where the gas diffusion resistance coefficient is higher than 3.2×10$^{-4}$ m, the power generation performance during a high load operation deteriorates.

In addition, it can be seen from FIG. 11 that, in Examples 2 and 3 and Comparative Examples 3 and 4, the cell resistances were similarly low over the entire current density range of 0 A/cm$^2$ to 3 A/cm$^2$. Even in the low current density range, the cell resistances were low. Therefore, it can be seen that the water retention of the ionomer 34 was high, and the drying of the catalyst layer was suppressed.

Based on the above results, the terminal-block type ionomer is used as the ionomer 34 of the cathode catalyst layer 14c, the terminal-block type ionomer including: the polymer chain of the random copolymer that includes the hydrophobic portion and the hydrophilic portion having a sulfonic acid group; and the hydrophilic block that has an aggregated structure of the hydrophilic portion positioned at the terminal of the polymer chain. Since the terminal-block type ionomer has high water retention, the drying of the cathode catalyst layer 14c can be suppressed. As a result, the power generation performance during a low load operation can be improved. In addition, the gas diffusion resistance coefficient of the cathode gas diffusion layer 16c is adjusted to be 3.2×10$^{-4}$ m or lower. In the terminal-block type ionomer, the oxygen permeability is high (20×10$^{-12}$ mol/(cm$^2$×s×atm) or higher at 30% RH or higher), and the gas diffusion resistance coefficient of the cathode gas diffusion layer 16c is adjusted to be 3.2×10$^{-4}$ m or lower. As a result, the occurrence of concentration overvoltage can be suppressed, and the power generation performance during a high load operation can be improved as shown in FIGS. 11 and 12. Therefore, the improvement of power generation performance during a low load operation and the improvement of power generation performance during a high load operation can be simultaneously realized.

From the viewpoint of improving the power generation performance during a high load operation, the gas diffusion resistance coefficient of the cathode gas diffusion layer 16c is preferably 3.0×10$^{-4}$ m or lower, more preferably 2.5×10$^{-4}$ m or lower, still more preferably 2.2×10$^{-4}$ m or lower.

It can be seen from the results of FIG. 9 that, in a case where the lower melting point water content in the ionomer 34 included in the cathode catalyst layer 14c is 28 dry % to 38 dry %, the power generation performance during a low load operation and a high load operation can be improved. When the lower melting point water content is 28 dry %, the number of repeats of the hydrophilic portion in the hydrophilic block is 13.9±2 (including measurement error). When the lower melting point water content is 38 dry %, the number of repeats of the hydrophilic portion in the hydrophilic block is 12.9±2 (including measurement error). It is presumed that, even in a case where the number of repeats of the hydrophilic portion is increased or decreased by 2, there are little effects on the amount of bound water and the amount of unbound water. Therefore, the number of repeats of the hydrophilic portion in the hydrophilic block is preferably 11 to 16, more preferably 12 to 15, and still more preferably 13 to 14.

Hereinabove, the embodiment of the disclosure has been described in detail, but the disclosure is not limited to the specific embodiment.

What is claimed is:
1. A fuel cell comprising:
an electrolyte membrane;
an anode catalyst layer that is provided on a first surface of the electrolyte membrane;

a cathode catalyst layer that includes an ionomer and is provided on a second surface of the electrolyte membrane, the ionomer including copolymers each of which has a hydrophilic block, the hydrophilic block being positioned at a terminal of the copolymer including a hydrophobic portion and a hydrophilic portion which has a sulfonic acid group, the hydrophilic block having an aggregated structure of the hydrophilic portion; and a cathode gas diffusion layer that is provided outside the cathode catalyst layer, wherein a gas diffusion resistance coefficient of the cathode catalyst layer represented by the following expression is $3.2 \times 10^{-4}$ m or lower, the gas diffusion resistance coefficient=a thickness of the cathode gas diffusion layer/(a porosity of the cathode gas diffusion layer)$^4$, wherein the hydrophilic portion has a structure represented by the following Formula A1, and the hydrophobic portion has a structure represented by the following Formula B1,

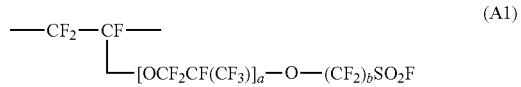

(A1)

where a represents an integer of 0 or more, and b represents an integer of 2 or more,

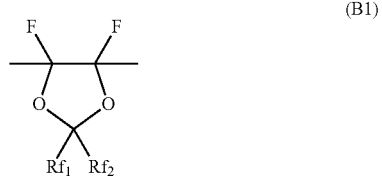

(B1)

where $Rf_1$ and $Rf_2$ each independently represent fluorine or a perfluoroalkyl group having 1 to 10 carbon atoms.

2. The fuel cell according to claim 1, wherein
the copolymer is a random copolymer having the hydrophilic portion at the terminal.

3. The fuel cell according to claim 1, wherein
the number of repeats of the hydrophilic portion in the hydrophilic block is 11 to 16.

4. The fuel cell according to claim 1, wherein
a lower melting point water content in the ionomer is 28 dry % to 38 dry %.

5. The fuel cell according to claim 1, wherein
an oxygen permeability of the ionomer at a relative humidity of 30% or higher is $20 \times 10^{-12}$ mol/(cm$^2$×s× atm) or higher.

6. The fuel cell according to claim 1, wherein
a portion of the copolymer other than the hydrophilic block includes a non-aggregated portion.

7. A fuel cell comprising:
an electrolyte membrane;
an anode catalyst layer that is provided on a first surface of the electrolyte membrane;

a cathode catalyst layer that includes an ionomer and is provided on a second surface of the electrolyte membrane, the ionomer including copolymers each of which has a hydrophilic block, the hydrophilic block being positioned at a terminal of the copolymer including a hydrophobic portion and a hydrophilic portion which has a sulfonic acid group, the hydrophilic block having an aggregated structure of the hydrophilic portion; and a cathode gas diffusion layer that is provided outside the cathode catalyst layer, wherein a gas diffusion resistance coefficient of the cathode catalyst layer represented by the following expression is $3.2 \times 10^{-4}$ m or lower, the gas diffusion resistance coefficient=a thickness of the cathode gas diffusion layer/(a porosity of the cathode gas diffusion layer)$^4$, wherein the hydrophilic portion has a structure represented by the following Formula A1, and the hydrophobic portion has a structure represented by the following Formula B1,

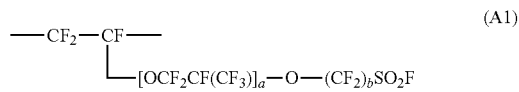

(A1)

where a represents an integer of 0 or more, and b represents an integer of 2 or more,

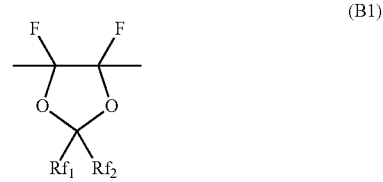

(B1)

where $Rf_1$ and $Rf_2$ each independently represent fluorine or a perfluoroalkyl group having 1 to 10 carbon atoms which has an ether bond in a middle of the perfluoroalkyl group.

8. The fuel cell according to claim 7, wherein
the copolymer is a random copolymer having the hydrophilic portion at the terminal.

9. The fuel cell according to claim 7, wherein
the number of repeats of the hydrophilic portion in the hydrophilic block is 11 to 16.

10. The fuel cell according to claim 7, wherein
a lower melting point water content in the ionomer is 28 dry % to 38 dry %.

11. The fuel cell according to claim 7, wherein
an oxygen permeability of the ionomer at a relative humidity of 30% or higher is $20 \times 10^{-12}$ mol/(cm$^2$×s× atm) or higher.

12. The fuel cell according to claim 7, wherein
a portion of the copolymer other than the hydrophilic block includes a non-aggregated portion.

* * * * *